United States Patent
Park et al.

(10) Patent No.: US 9,727,799 B2
(45) Date of Patent: Aug. 8, 2017

(54) METHOD OF AUTOMATIC DEFECT CLASSIFICATION

(71) Applicant: Samsung Electronics Co., Ltd., Suwon-si, Gyeonggi-do (KR)

(72) Inventors: Il-suk Park, Hwaseong-si (KR); Jeong-ho Ahn, Hwaseong-si (KR); Hyung-suk Cho, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 39 days.

(21) Appl. No.: 14/819,566

(22) Filed: Aug. 6, 2015

(65) Prior Publication Data
US 2016/0180513 A1    Jun. 23, 2016

(30) Foreign Application Priority Data
Dec. 22, 2014    (KR) .................. 10-2014-0186370

(51) Int. Cl.
G06K 9/00    (2006.01)
G06K 9/48    (2006.01)
G06K 9/62    (2006.01)
G06T 7/00    (2017.01)

(52) U.S. Cl.
CPC .......... G06K 9/481 (2013.01); G06K 9/6201 (2013.01); G06T 7/001 (2013.01); G06K 2009/6213 (2013.01); G06K 2209/19 (2013.01); G06T 2207/10061 (2013.01); G06T 2207/30148 (2013.01)

(58) Field of Classification Search
CPC .......... G06T 7/001; G06T 2207/10061; G06K 2009/6213; G06K 9/00134; G06K 9/0014; G06K 9/00147; G06K 9/481; G06K 9/6201

USPC ............... 382/141, 145, 149; 348/86, 92
See application file for complete search history.

(56) References Cited

U.S. PATENT DOCUMENTS

| | | | |
|---|---|---|---|
| 6,456,899 B1 * | 9/2002 | Gleason | G03F 7/7065 700/110 |
| 8,175,373 B2 * | 5/2012 | Abbott | G06T 7/0006 356/237.4 |
| 8,595,666 B2 | 11/2013 | Hayakawa et al. | |

(Continued)

FOREIGN PATENT DOCUMENTS

| JP | 2008-082740 | 4/2008 |
|---|---|---|
| JP | 2011-141133 | 7/2011 |

(Continued)

*Primary Examiner* — Daniel Mariam
(74) *Attorney, Agent, or Firm* — Myers Bigel, P.A.

(57) ABSTRACT

A method of automatic defect classification (ADC) includes detecting defective parts from a substrate wherein at least one unit process is performed; and classifying defect types of the respective defective parts, wherein the classifying includes obtaining a scanning electron microscope (SEM) image of each of the defective parts; registering information about the substrate in a graphic data system (GDS) image corresponding to each SEM image; defining a plurality of defects of interest (DOIs) categorizing defects of the respective defective parts; defining a DOI rule that is a criterion for determining which defects of the respective defective parts correspond to which DOI from among the DOIs; and analyzing the image to classify which defects of the respective defective parts correspond to which DOI from among the DOIs according to the DOI rule.

20 Claims, 13 Drawing Sheets

(56) References Cited

U.S. PATENT DOCUMENTS

| | | |
|---|---|---|
| 8,824,773 B2 | 9/2014 | Minekawa et al. |
| 9,020,237 B2 * | 4/2015 | Hirai .................... G06T 7/0004 382/149 |
| 9,092,846 B2 * | 7/2015 | Wu ........................ G06T 7/001 |
| 9,436,990 B2 * | 9/2016 | Otani ................. G02B 21/0004 |
| 2012/0068065 A1 | 3/2012 | Mitsui |
| 2012/0246620 A1 | 9/2012 | Bellucci et al. |
| 2013/0070078 A1 | 3/2013 | Takagi et al. |
| 2013/0174102 A1 | 7/2013 | Leu |
| 2013/0222574 A1 | 8/2013 | Nakagaki et al. |
| 2013/0231769 A1 | 9/2013 | Tien et al. |
| 2013/0279794 A1 | 10/2013 | Greenberg et al. |
| 2014/0219544 A1 | 8/2014 | Wu et al. |

FOREIGN PATENT DOCUMENTS

| | | |
|---|---|---|
| JP | 2012-068051 | 4/2012 |
| KR | 10-2010-0076471 A | 7/2010 |
| KR | 10-2012-0095429 A | 8/2012 |

\* cited by examiner

METHOD OF AUTOMATIC DEFECT CLASSIFICATION

CROSS-REFERENCE TO RELATED APPLICATION

This application claims the benefit of Korean Patent Application No. 10-2014-0186370, filed Dec. 22, 2014, in the Korean Intellectual Property Office, the disclosure of which is hereby incorporated herein by reference in its entirety.

FIELD

The inventive concept relates to a method of automatic defect classification (ADC), and more particularly, to a method of automatically classifying defect types by using scanning electron microscope (SEM)/graphic data system (GDS) images.

BACKGROUND

Recently, there is increased demand for semiconductor devices capable of operating at high-speed and having large-capacity storage, and thus an integration degree of such semiconductor devices has increased. It is becoming increasingly important to control defects which may occur on substrates as the integration degree of semiconductor devices increases. Therefore, ADC processes may be required, which perform a defect classification process in order to control the defects which may occur on the substrates and improve process efficiency and reliability.

SUMMARY

The inventive concept provides a method of automatically classifying defects which may occur on highly integrated substrates with high reliability.

According to an aspect of the inventive concept, a method of automatic defect classification (ADC) may include detecting defective parts from a substrate in which at least one unit process is performed; and classifying defect types of the respective defective parts, wherein the classifying may include obtaining a scanning electron microscope (SEM) image of each of the defective parts; registering information about the substrate in a graphic data system (GDS) image corresponding to each SEM image; defining a plurality of defects of interest (DOIs) categorizing defects of the respective defective parts; defining a DOI rule that is a criterion for determining which defects of the respective defective parts correspond to which DOI from among the DOIs; and analyzing the image to classify which defects of the respective defective parts correspond to which DOI from among the DOIs according to the DOI rule.

In some embodiments, in the registering, the information about the substrate may include at least one piece of information about one of an insulating line pattern, a conductive line pattern, and a conductive dot pattern. The substrate information may include at least one piece of material information about one of the insulating line pattern, the conductive line pattern, and the conductive dot pattern.

In some embodiments, the analyzing may include obtaining a matching image containing matched region and an unmatched region by matching the SEM image with the GDS image; and analyzing the unmatched region.

The analyzing of the unmatched region may include comparing and analyzing material information about the unmatched region with material information registered in the GDS image in a region corresponding to the unmatched region.

In some embodiments, the information about the substrate may include material information about the conductive line pattern, any one DOI from among the DOIs includes an insulating line bridge, and in order to classify a defective part as the insulating line bridge, the DOI rule is defined as "when the material information registered in the GDS image of the region corresponding to the unmatched region is the same as the material information about the conductive line pattern, the DOI is classified as the insulating line bridge."

In some embodiments, the information about the substrate may include material information about the insulating line pattern, any one DOI from among the DOIs includes a conductive line bridge, and in order to classify the DOI into the insulating line bridge, the DOI rule is defined as "when the material information registered in the GDS image of the region corresponding to the unmatched region is the same as the material information about the insulating line pattern, the DOI is classified as the conductive line bridge."

In some embodiments, the information about the substrate may include material information about the conductive dot pattern and material information about a barrier layer surrounding the conductive dot pattern, any one DOI from among the DOIs includes a conductive dot void, and in order to classify the DOI into the conductive dot void, the DOI rule is defined as "when the unmatched region is positioned in the barrier layer while the material information registered in the GDS image of the region corresponding to the unmatched region is the same as the material information about the conductive dot pattern, the DOI is classified as the conductive dot void."

In some embodiments, the defining of the DOI rule may include defining a temporary DOI rule; determining reliability of the temporary DOI rule; and defining the temporary DOI rule as a fixed DOI rule when it is determined that the temporary DOI rule is appropriate for determining the reliability.

The method of ADC may further include analyzing a cause of a defect, based on a result of the classifying the defect; and correcting a process recipe of the unit process based on the cause of the defect.

According to another aspect of the inventive concept, a method of ADC may include detecting defective parts from a substrate wherein at least one unit process is performed; a first classifying defect types of the respective defective parts by using a feature vector; and a second classifying the defect types of the respective defective parts by using an SEM image, wherein the secondary classifying of the defect types includes defining a plurality of DOIs; defining a DOI rule determining which defects of the respective defective parts correspond to which DOI from among the DOIs; and analyzing the SEM image and a GDS image according to the DOI rule and classifying which defects of the respective defective parts correspond to which DOI from among the DOIs.

In some embodiments, the detecting of the defect may include obtaining an optical image of the substrate by using an optical inspection apparatus and thereby generating a substrate map, the method may further include a third classifying the defect types on the substrate map.

The third classifying may include defining a plurality of map DOIs categorizing the defect types on the substrate map; and defining a map DOI rule determining which defects on the substrate map correspond to which DOI from among the DOIs.

In some embodiments, the analyzing may include obtaining the SEM image of each of the defective parts; and registering substrate information in the GDS images corresponding to the SEM images.

The first classifying may precede the second classifying.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
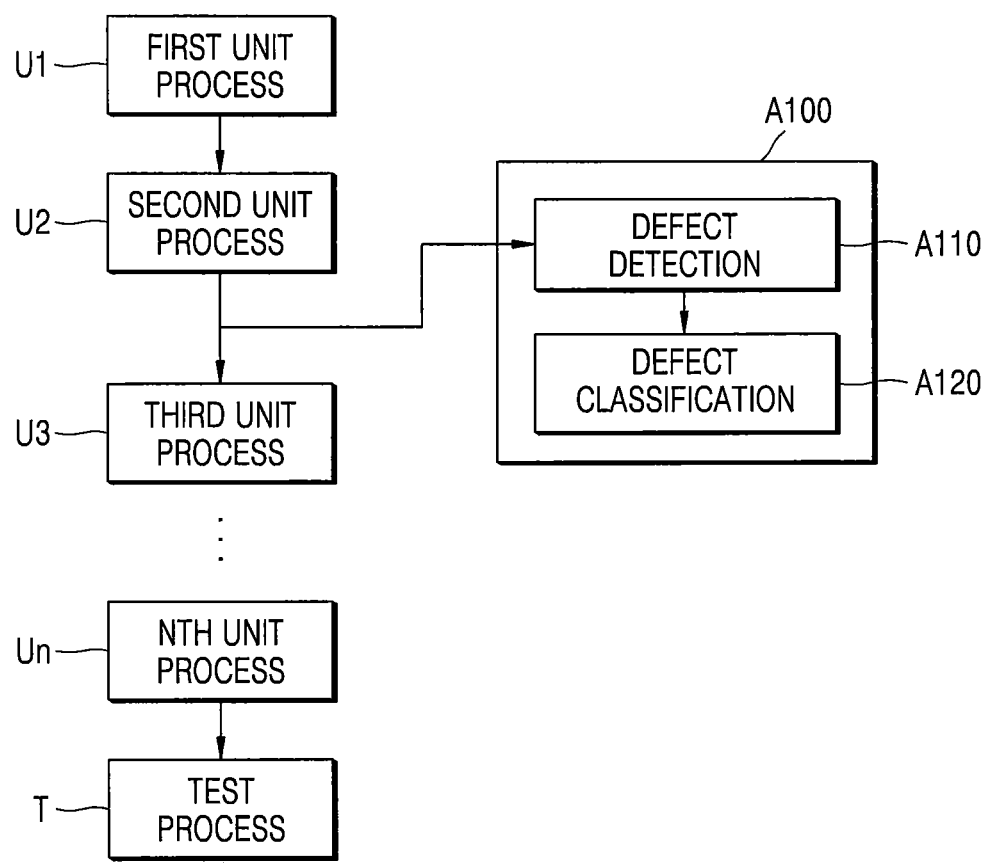
FIG. 1 is an exemplary view of a semiconductor manufacturing process including an automatic defect classification (ADC) process according to an embodiment of the inventive concept.

The inventive concept will be described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the sizes of layers and regions may be exaggerated for clarity. The same reference numerals are used to denote the same elements, and repeated descriptions thereof will be omitted.

It will be understood that, although the terms "first," "second," etc. may be used herein to describe various elements, components, regions, layers and/or sections, these elements, components, regions, layers and/or sections should not be limited by these terms. Thus, a first element, component, region, layer or section discussed below could be termed a second element, component, region, layer or section without departing from the teachings of the inventive concept.

Unless otherwise defined, all terms (including technical and scientific terms) used herein have the same meaning as commonly understood by one of ordinary skill in the art to which this inventive concept belongs. It will be further understood that terms, such as those defined as commonly used dictionaries, should be interpreted as having a meaning that is consistent with their meaning in the context of the relevant art and this specification and will not be interpreted in an idealized or overly formal sense unless explicitly so defined herein.

When some embodiments may be embodied otherwise, respective process steps described herein may be performed otherwise. For example, two process steps described in a sequential order may be performed substantially the same time or in reverse order.

Variations from the shapes of the illustrations as a result, for example, of manufacturing techniques and/or tolerances, are to be expected. Thus, embodiments of the present inventive concept should not be construed as limited to the particular shapes of regions illustrated herein but are to include deviations in shapes that result, for example, from manufacturing.

The term "defect" may mean any anomalies found on a substrate.

The term "substrate" may mean a substrate including semiconductor or non-semiconductor material. Single crystal silicon, gallium arsenide and indium phosphide may be included as examples of the semiconductor or the non-semiconductor material, but are not limited thereto.

The term "substrate" may include a wafer.

Meanwhile, the wafer may mean a pure silicon substrate. Furthermore, the wafer may include at least one layer formed on the pure silicon substrate. For example, the layers May include insulating paint, insulating material or conductive material. The insulating paint may include any material capable of being patterned by optical lithography techniques, electron beam lithography techniques or x-ray lithography techniques. Examples of insulating material may include silicon oxide, silicon nitride, silicon oxynitride or titanium nitride, but are not limited thereto.

Furthermore, examples of conductive material may include aluminum, polysilicon or tin, but are not limited thereto.

The at least one layer formed on the wafer may be patterned or not. For example, the wafer may include a plurality of dies having iterative pattern features. Forming and processing of such material layers are ultimately necessary to complete a semiconductor device. In this way, the wafer may include a substrate in which all layers of a completed semiconductor device are not formed or a substrate in which all layers of a completed semiconductor device are formed. Furthermore, a micro electro mechanical systems (MEMS) device and other similar devices may also be formed in the wafer of the inventive concept.

FIG. 1 is an exemplary view of a semiconductor manufacturing process including an automatic defect classification (ADC) process A100 according to an embodiment of the inventive concept.

Referring to FIG. 1, the semiconductor manufacturing process may include a plurality of unit processes U1 to Un, at least one ADC process A100 and a test process T.

Each of the plurality of unit processes U1 to Un may be one from among required unit processes in manufacturing of the semiconductor device. For example, each of the unit processes U1 to Un may be one from among various unit processes such as an element isolation film (STI: shallow trench isolation) forming process, an active layer forming process, an ion implantation process, a gate layer forming process, and a circuit pattern forming process.

After completing the unit processes U1 to Un, the test process T inspecting electrical characteristics of a substrate (not shown) in which the unit processes U1 to Un are completed may be performed. For example, the test process T may be an electrical die sorting (EDS) process that is performed between a fab process and an assembly process and tests electrical characteristics of semiconductor devices (not shown) formed in the substrate.

The EDS process applies electrical signals to pads formed along peripheral portions of the respective semiconductor devices formed in the substrate, and determines whether semiconductor devices have electrical defects or not by signals outputted corresponding to the applied electrical signals.

Meanwhile, after completing at least one unit process from among the unit processes U1 to Un, the ADC process A100 according to embodiments of the inventive concept may be performed.

The ADC process A100 is illustrated as performed only before performing a third unit process U3 after performing a second unit process U2, but is not limited thereto. For example, the ADC process A100 may be performed whenever each of the unit processes U1 to Un is completed.

Hereinafter, a case of performing the ADC process A100 before performing the third unit process U3 after performing the second unit process U2 will be explained as an example for convenience of explanation.

The ADC process A100 may include a defect detection process A110 and a defect classification process A120.

The defect detection process A110 is a process of detecting defects on the substrate (not shown) after the second unit process U2 is performed, and may be performed through an optical inspection apparatus using, for example, laser, ultraviolet ray, visible light and so on.

Through the defect detection process A110, a plurality of defective parts (not shown) capable of being positioned on the substrate after the second unit process U2 is performed may be detected.

In the defect classification process A120, defect types of the respective defective parts that are detected are classified.

The defect classification process A120 of the inventive concept may include a defect classification process using a scanning electron microscope (SEM) image that will be explained by referring to FIGS. 2 to 9.

Furthermore, the defect classification process A120 of the inventive concept may further include a defect classification process (refer to FIGS. 10 to 12) using a substrate map and a defect classification process (refer to FIGS. 13 and 14) using a feature vector, that will be explained by referring to FIGS. 10 to 14.

Hereinafter, detailed description of the defect classification process using the SEM image, the defect classification process using the substrate map, and the defect classification process using the feature vector substrate map will be given.

Figure 2:
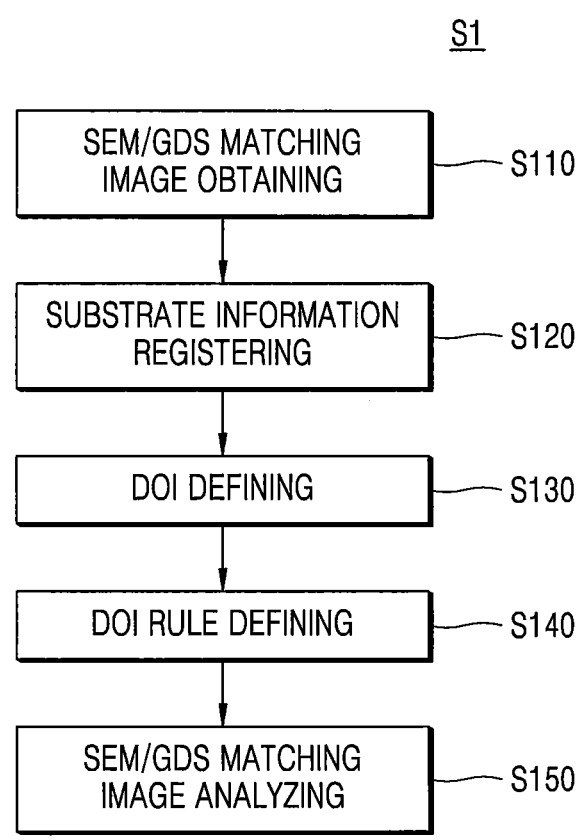
FIG. 2 is a flowchart of a defect classification process using a scanning electron microscope (SEM) image according to an embodiment of the inventive concept.

FIG. 2 is a flowchart of a defect classification process S1 using an SEM image according to an embodiment of the inventive concept.

Referring to FIG. 2, the defect classification process S1 using the SEM image may include a scanning electron microscope (SEM)/graphic data system (GDS) matching image obtaining step S110, a substrate information registering step S120, a defect of interest (DOI) defining step S130, a DOI rule defining step S140, and an SEM/GDS matching image analyzing step S150.

In the SEM/GDS matching image obtaining step S110, the respective SEM/GDS matching images of the defective parts detected by the defect detection process A110 described with reference to FIG. 1 may be obtained.

The SEM image may be obtained by a scanning electron microscope scanning a part of the defective parts with a focused beam of electrons.

The GDS image, having a layout storage format in a region corresponding to the SEM image, may play a role as standard being matched with the SEM image and analyzed. The GDS image may be generated by using, for example, a conversion tool generating the GDS image.

In the substrate information registering step S120, substrate information that is subject to the defect classification process S1 may be registered in the GDS image.

The substrate information may include pattern information, for example, line pattern and dot pattern information, informing that which pattern is formed on the substrate.

In some embodiments, the information about the substrate may include material information about the line pattern and dot pattern.

For example, when the second unit process U2 of FIG. 1 is a process forming an active layer on the substrate, the information about the substrate may include, for example, material information about the active layer, that the active layer is silicon, etc.

For another example, when the second unit process U2 is a process forming a gate layer on the substrate, the information about the substrate may include, for example, that the gate layer is made of tungsten (W), etc.

For another example, when the second unit process U2 is a process forming a conductive pattern on the substrate, the information about the substrate may include, for example, that the conductive pattern is made of tin (Cu), etc.

In the DOI defining step S130, defect types of the defective parts may be defined. In other words, DOIs defined in the DOI defining step S130 may be results categorizing the defects of the defective parts.

Figure 4B:
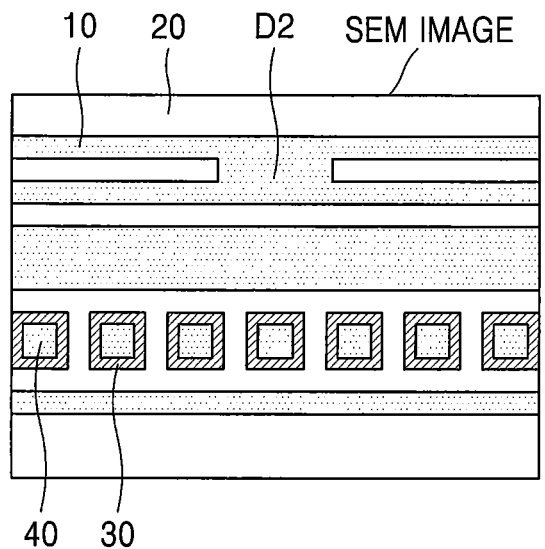
Figure 5A:
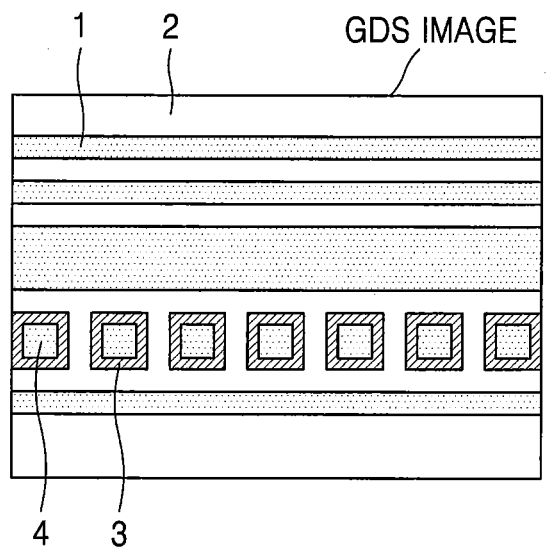
FIGS. 5A to 5C are exemplary views of detecting an conductive dot void through the defect classification process using the SEM image.
Figure 5B:
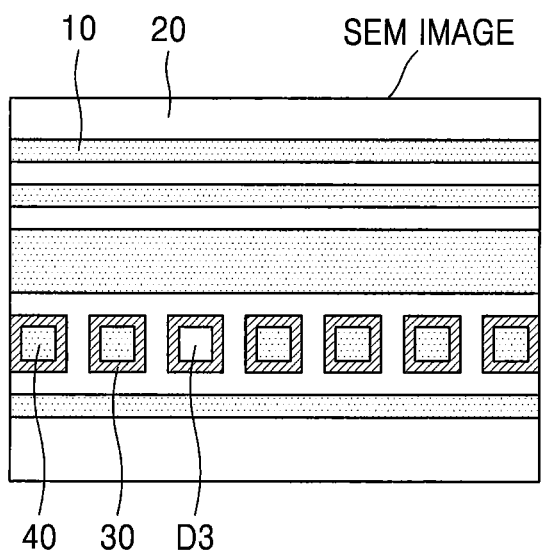

For example, the DOIs may include an insulating line bridge (referring to FIG. 3B), a metal line bridge (referring to FIG. 4B), and a metal dot void (referring to FIG. 5B). Furthermore, the DOIs may include, for example, out-of-specification of a pattern width, not removing of process residue, a scratch and so on.

In the DOI rule defining step S140, a DOI rule that is a criterion for determining which defects of the respective defective parts correspond to which DOI from among the DOIs may be defined. In other words, the DOI rule may be criteria for determining the respective DOIs.

For example, the DOI rule may include "when the material information registered in the GDS image of the region corresponding to the unmatched region is the same as the material information about the conductive line pattern, the DOI is classified as the insulating line bridge," "when the material information registered in the GDS image of the region corresponding to the unmatched region is the same as the material information about the insulating line pattern, the DOI is classified as the conductive line bridge," and "when the unmatched region is positioned in the barrier layer while the material information registered in the GDS image of the region corresponding to the unmatched region is the same as the material information about the conductive dot pattern, the DOI is classified as the conductive dot void." The related detailed description will be described below referring to FIGS. 3A to 5C.

The SEM/GDS matching image analyzing step S150 may be performed after the DOI rule defining step S140. In the SEM/GDS matching image analyzing step S150, it is possible to analyze the SEM image and the GDS image according to the DOI rule and classify which defects of the respective defective parts correspond to which DOI from among the DOIs.

For example, in the SEM/GDS matching image analyzing step S150, it is possible to match the SEM image and GDS image corresponding to the respective defective parts and classify whether the results matched according to the DOI rule correspond to which DOI from among the DOIs.

It is possible to reduce process time and process cost by defining a DOI rule and classifying defects of corresponding region according to the DOI rule like in the present exemplary embodiment. A passive defect classification by an operator can take a long time, and can incur significant costs due to the labor intensive effort of performing re-examination and classification of the defects.

Furthermore, according to the present exemplary embodiment, a yield of a semiconductor device manufacturing process may be ultimately improved through defect classification with high reliability. When the operator passively classifies the defect types by observing the SEM image, there may exist a physical limitation due to having to classify numerous defective parts on the substrate one by one, and continuous and iterative consideration of numerous defect images of the defective parts or other data may cause fatigue and loss of concentration in the operator.

The detailed description of image analyzing performed by using the DOI rule will be described below by referring to FIGS. 3A to 3C.

Figure 3A:
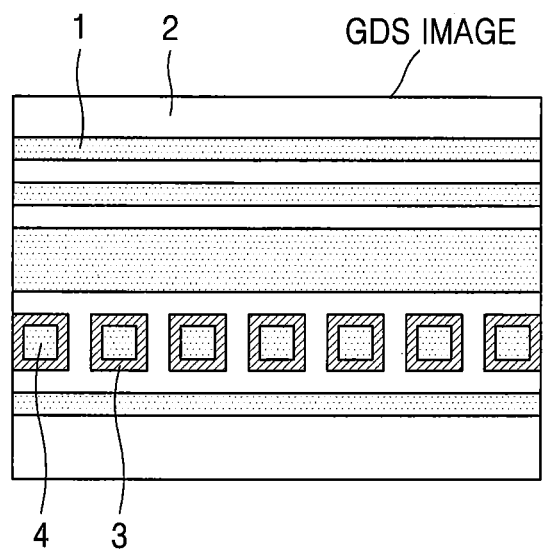
FIGS. 3A to 3C are exemplary views of detecting an insulating line bridge through the defect classification process using the SEM image.
Figure 3B:
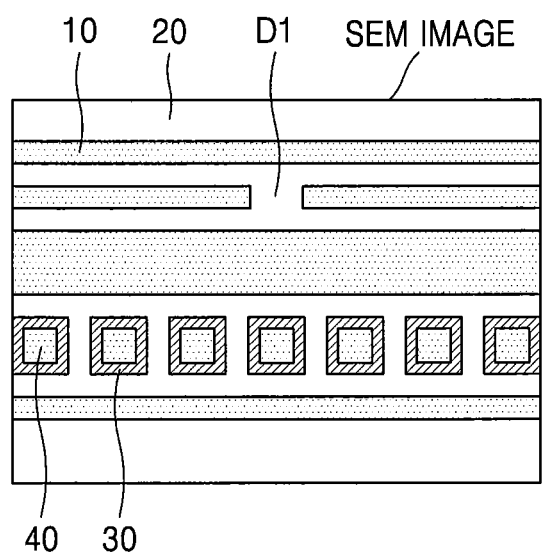
Figure 3C:
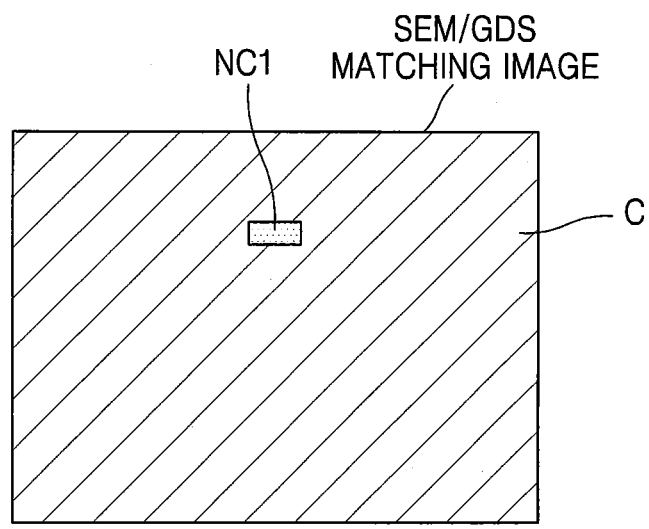

FIGS. 3A to 3C are exemplary views of detecting an insulating line bridge through the defect classification process S1 using the SEM image.

In FIGS. 3A to 3C, FIG. 3A represents a GDS image, FIG. 3B represents an SEM image, and FIG. 3C represents a SEM/GDS matching image.

Referring to FIG. 3A, the GDS image may include a conductive line pattern 1, an insulating line pattern 2, a barrier layer 3, and a conductive dot pattern 4.

In some embodiments, the information about the substrate described with reference to FIG. 2 may be registered in the GDS image. In detail, at least one piece of material information about one of the conductive line pattern 1, the insulating line pattern 2, the barrier layer 3, and the conductive dot pattern 4 may be registered in the GDS image. For example, information that the conductive line pattern 1 and the conductive dot pattern 4 are made of Cu, and the insulating line pattern 2 is made of silicon oxide may be registered in the GDS image.

Referring to FIG. 3B, the SEM image may include a conductive line pattern 10, an insulating line pattern 20, a barrier layer 30 and a conductive dot pattern 40. It is possible to confirm that the defect type of corresponding region is an insulating line bridge D1 through the SEM image.

Meanwhile, in the inventive concept, the defect type of corresponding region may be classified by matching and analyzing the SEM image and the GDS image without process of confirming the SEM image and determining the defect type by the operator.

Referring to FIG. 3C, the SEM/GDS matching image may include a matched region C and an unmatched region NC1.

The SEM/GDS matching image may be a subtraction result of the GDS image (of FIG. 3A) and the SEM image (of FIG. 3B).

The matched region C may be a matching result in a region in which the GDS image (of FIG. 3A) and the SEM image (of FIG. 3B) are matched, the unmatched region NC1 may be a matching result in a region in which the GDS image and the SEM image are not matched.

In the inventive concept, the defect type of corresponding region may be automatically classified by analyzing the unmatched region NC1.

In detail, the unmatched region NC1 may be formed in where the conductive line pattern 1 is positioned. Since the material information about the conductive line pattern 1 is registered in the GDS image, it is possible to confirm that the defect type is the insulating line bridge D1 when the material information registered in the GDS image of the unmatched region NC1 is the material information about the conductive line pattern 1.

In this case, the DOI rule described with reference to FIG. 2 may be defined similar to, for example, "when the material information registered in the GDS image in the region corresponding to the unmatched region is the same as the material information about the conductive line pattern, the DOI is classified as the insulating line bridge."

Figure 4A:
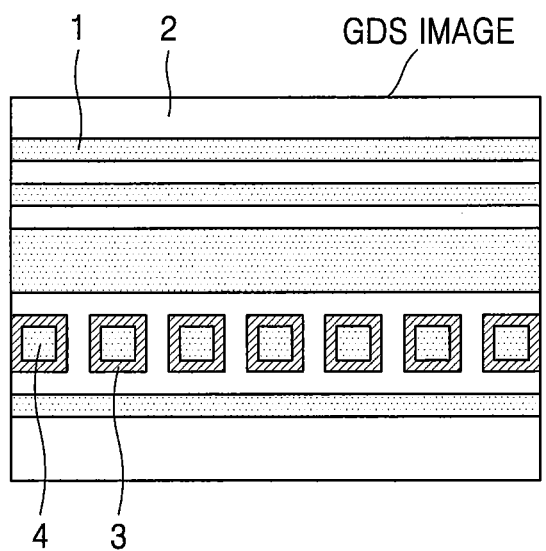
FIGS. 4A to 4C are exemplary views of detecting an conductive line bridge through the defect classification process using the SEM image.
Figure 4C:
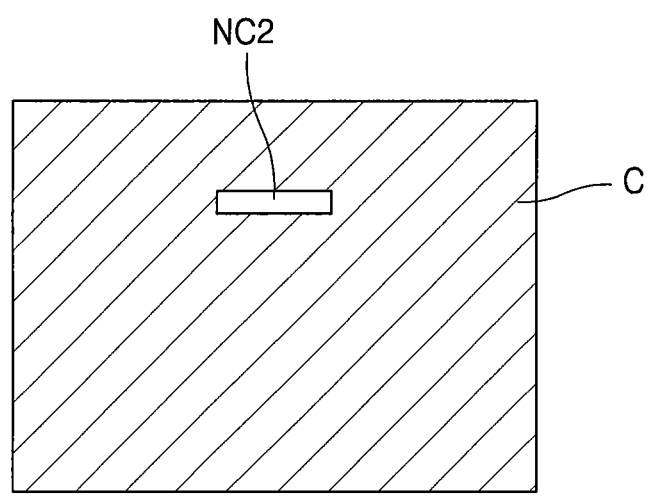

FIGS. 4A to 4C are exemplary views of detecting a conductive line bridge through the defect classification process S1 using the SEM image.

In FIGS. 4A to 4C, FIG. 4A represents a GDS image, FIG. 4B represents an SEM image, and FIG. 4C represents an SEM/GDS matching image.

Referring to FIG. 4A, the GDS image may include a conductive line pattern 1, an insulating line pattern 2, a barrier layer 3, and a conductive dot pattern 4. Description of the GDS image of FIG. 4A is excluded as explanation about the GDS image was given above with respect to FIG. 3A.

Referring to FIG. 4B, the SEM image may include a conductive line pattern 10, an insulating line pattern 20, a barrier layer 30, and a conductive dot pattern 40.

It is possible to confirm that the defect type of corresponding region is a conductive line bridge D2 through the SEM image.

Referring to FIG. 4C, the SEM/GDS matching image may include a matched region C and an unmatched region NC2.

The SEM/GDS matching image may be a subtraction result of the GDS image (of FIG. 4A) and the SEM image (of FIG. 4B).

The matched region C may be a matching result in a region in which the GDS image (of FIG. 4A) and the SEM image (of FIG. 4B) are matched, the unmatched region NC2 may be a matching result in a region in which the GDS image and the SEM image are not matched.

Similar to the explanation referring to FIGS. 3A to 3C, it is possible to automatically classify that the defect type of corresponding region is the conductive line bridge D2 by analyzing the unmatched region NC2.

In detail, the unmatched region NC2 may be formed in where the insulating line pattern 2 is positioned. Since the material information about the insulating line pattern 2 is registered in the GDS image, it is possible to confirm that the defect type is the insulating line pattern 2 when the material information registered in the GDS image of the unmatched region NC2 is the material information about the conductive line pattern 2.

In this case, the DOI rule described with reference to FIG. 2 may be defined similar to, for example, "when the material information registered in the GDS image in the region corresponding to the unmatched region is the same as the material information about the insulating line pattern, the DOI is classified as the conductive line bridge."

Figure 5C:
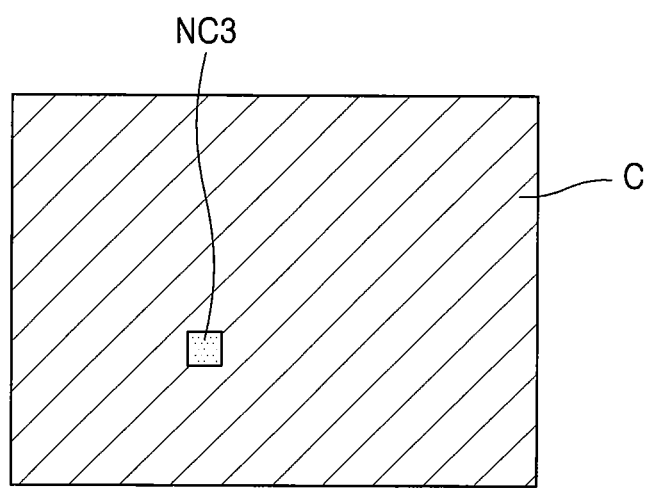

FIGS. 5A to 5C are exemplary views of detecting a conductive dot void through the defect classification process S1 using the SEM image.

In FIGS. 5A to 5C, FIG. 5A represents a GDS image, FIG. 5B represents an SEM image, and FIG. 5C represents an SEM/GDS matching image.

Referring to FIG. 5A, the GDS image may include a conductive line pattern 1, an insulating line pattern 2, a barrier layer 3, and a conductive dot pattern 4. Description of the GDS image is excluded as explanation about the GDS image was given above with respect to FIG. 3A.

Referring to FIG. 5B, the SEM image may include a conductive line pattern 10, an insulating line pattern 20, a barrier layer 30, and a conductive dot pattern 40. It is possible to confirm that the defect type of corresponding region is a conductive dot void D3 through the SEM image.

Referring to FIG. 5C, the SEM/GDS matching image may include a matched region C and an unmatched region NC3.

The SEM/GDS matching image may be a subtraction result of the GDS image (of FIG. 4A) and the SEM image (of FIG. 4B).

The matched region C may be a matching result in a region in which the GDS image (of FIG. 5A) and the SEM image (of FIG. 5B) are matched, the unmatched region NC3 may be a matching result in a region in which the GDS image and the SEM image are not matched.

Similar to the explanation referring to FIGS. 3A to 3C, it is possible to automatically classify that the defect type of corresponding region is the conductive dot void D3 by analyzing the unmatched region NC3.

In detail, the unmatched region NC3 may be formed in where the conductive dot pattern 4 is positioned. Since the material information about the conductive dot pattern 4 is registered in the GDS image, it is possible to confirm that the defect type is the conductive dot void D3 when the material information registered in the GDS image of the unmatched region NC3 is the material information about the conductive dot pattern 4.

However, when the conductive dot pattern 4 is made of the same material with that of the conductive line pattern 1, it is difficult to distinguish whether the defect type is the insulating line bridge D1 (of FIG. 3B) or the conductive dot void D3. Therefore, a position of the unmatched region NC3 may be further considered in order to determine whether the defect type is the conductive dot void D3 or not. In other words, since the conductive dot pattern 4 is formed in the barrier layer 3, it is possible to confirm that the defect type of when the unmatched region NC3 is positioned in the barrier layer 3 is not the insulating line bridge D1 but the conductive dot void D3.

In this case, the DOI rule described with reference to FIG. 2 may be defined similar to, for example, "when an unmatched region is positioned in a barrier layer while material information registered in a GDS image of a region corresponding to the unmatched region is the same as material information about a conductive dot pattern, a DOI is classified as a conductive dot void."

Figure 6:
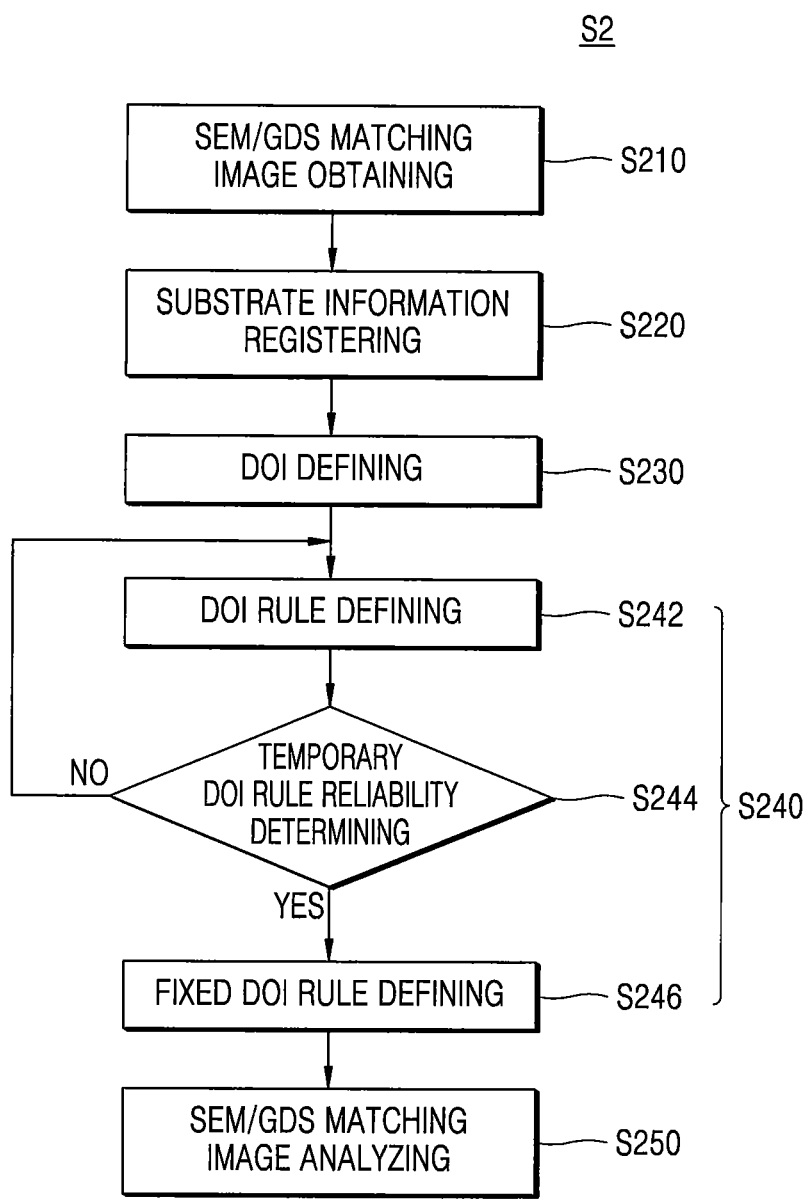
FIG. 6 is a flowchart of a defect classification process using an SEM image according to another embodiment of the inventive concept.

FIG. 6 is a flowchart of a defect classification process S2 using an SEM image according to another embodiment of the inventive concept.

Referring to FIG. 6, the defect classification process S2 using the SEM image may include an SEM/GDS matching image obtaining step S210, a substrate information registering step S220, a DOI defining step S230, a DOI rule defining step S240, and an SEM/GDS matching image analyzing step S250.

The defect classification process S2 according to the present exemplary embodiment may be similar to the defect classification process S1 described with reference to FIG. 2 except for the DOI rule defining step S240, and may perform the SEM/GDS matching image obtaining step S210, the substrate information registering step S220, the DOI defining step S230, the DOI rule defining step S240, and the SEM/GDS matching image analyzing step S250 by respectively performing operations similar to those of the SEM/GDS matching image obtaining step S110, the substrate information registering step S120, the DOI defining step S130, and the SEM/GDS matching image analyzing step S150 described with reference to FIG. 2. Therefore, the DOI rule defining step S240 will be mainly explained in the present exemplary embodiment.

The DOI rule defining step S240 may include a temporary DOI rule defining step S242, a temporary DOI rule reliability determining step S244, and a fixed DOI rule defining step S246.

The temporary DOI rule defining step S242 may define the temporary DOI rule that is a criterion for determining which defects of the respective defective parts correspond to which DOI from among the DOIs.

The temporary DOI rule reliability determining step S244 may determine whether a defect classification result by the temporary DOI rule reaches or exceeds a criteria reliability value.

For example, the temporary DOI rule may be determined appropriate when a number of defective parts in which defect classification is properly performed is a certain percent (for example, 99%) or more of the entire number of defective parts, in other words, when a number of defective parts in which defect classification is not properly performed is a certain percent (for example, 1%) or less of the entire number of defective parts.

When the temporary DOI rule is appropriate, the temporary DOI rule is defined as a fixed DOI rule (S246).

When the temporary DOI rule is not appropriate, the temporary DOI rule may be corrected and redefined.

The SEM/GDS matching image analyzing step S250 may analyze the SEM image and the GDS image according to the fixed DOI rule and may classify which defects of the respective defective parts correspond to which DOI from among the DOIs.

Figure 7:
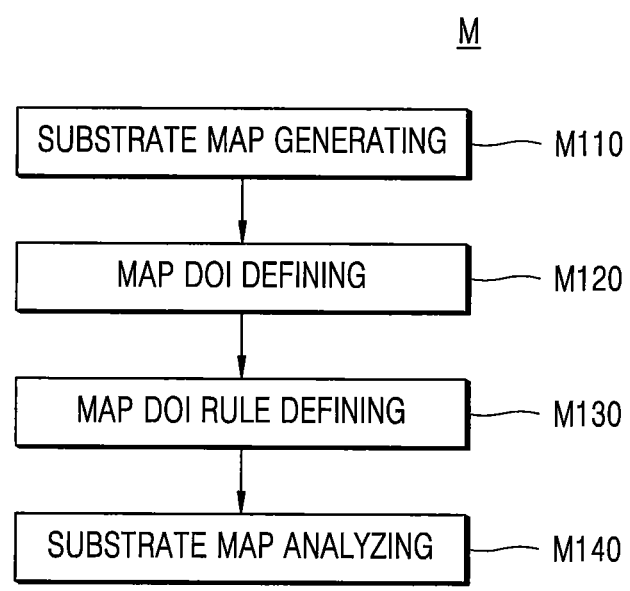
FIG. 7 is a flowchart of a defect classification process using a substrate map according to an embodiment of the inventive concept.

FIG. 7 is a flowchart of a defect classification process M using a substrate map according to an embodiment of the inventive concept.

Referring to FIG. 7, the defect classification process M using the substrate map may include a substrate map generating step M110, a map DOI defining step M120, a map DOI rule defining step M130, and a substrate map analyzing step M140.

Figure 8:
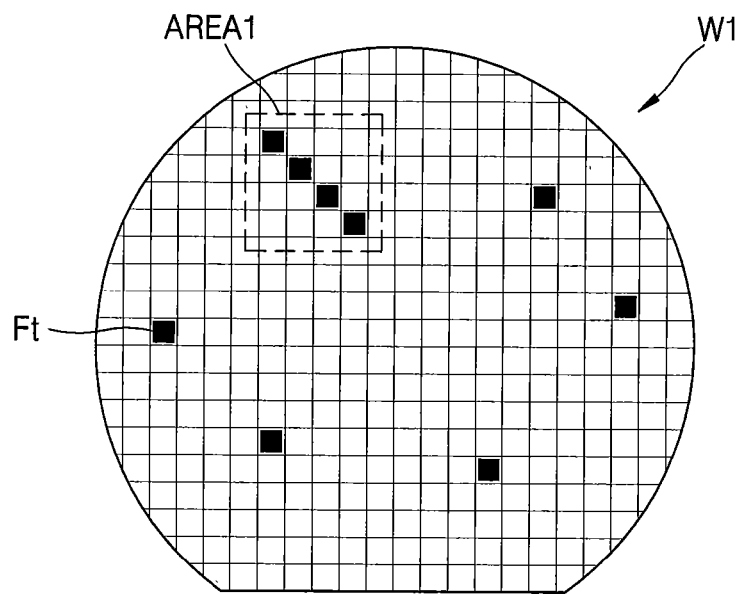
FIG. 8 is an exemplary view of detecting a scratch through a defect classification process using a substrate map.
Figure 9:
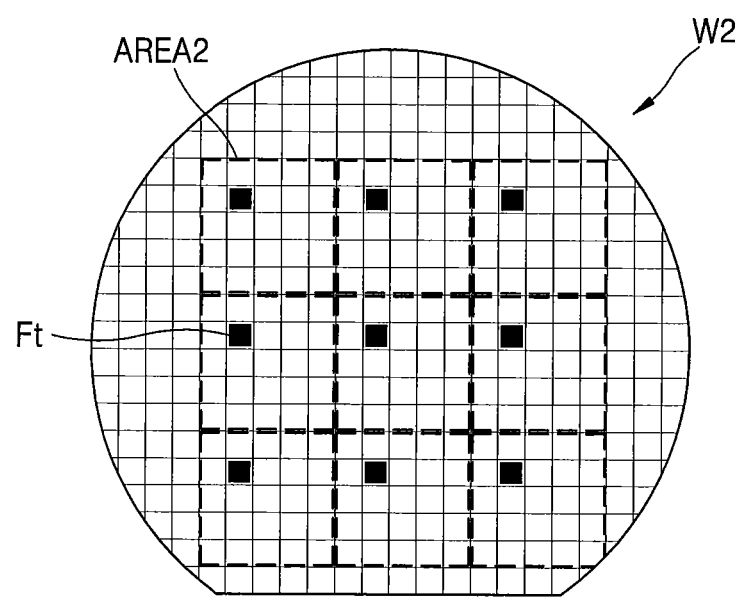
FIG. 9 is an exemplary view of detecting a photomask defect through a defect classification process using a substrate map.

The substrate map generating step M110 may generate a substrate map similar to substrate maps W1 and W2 respectively shown in FIGS. 8 and 9 by obtaining an optical image of a substrate in which at least one unit process is performed by using, for example, an optical inspection apparatus. The optical inspection apparatus may be an inspection apparatus using, for example, laser, ultraviolet ray, visible light and so on.

The map DOI defining step M120 may define maps DOIs categorizing the defect type on the substrate map. For example, the maps DOIs may include a scratch (refer to FIG. 8) and a mask defect (refer to FIG. 9).

In some embodiments, the maps DOIs may be separately constituted from the DOIs described with reference to FIGS. 2 to 6. In some other embodiments, at least a part of maps DOIs from among the maps DOIs may be included in the DOIs described with reference to FIGS. 2 to 6.

The map DOI rule defining step M130 may define a map DOI rule that is a criterion for determining that the defect types on the substrate map correspond to which map DOI from among the maps DOIs. In other words, the map DOI rule may be criteria for determining the respective maps DOIs.

For example, the map DOI rule may include "when at least three defects are continuously formed with fixed directivity, the map DOI is classified as a scratch." or "when defective parts are repeatedly disposed based on a unit area, the map DOI is classified as photomask defect." The related detailed description will be described below referring to FIGS. 8 and 9.

The substrate map analyzing step M140 may analyze the substrate map according to the map DOI rule and may classify that the defects on the substrate map correspond to which map DOI from among the maps DOIs.

In some embodiments, the defect classification process M using the substrate map may be separately performed from the defect classification process S1 or S2 using the SEM image described with reference to FIG. 2 or 6.

Figure 12:
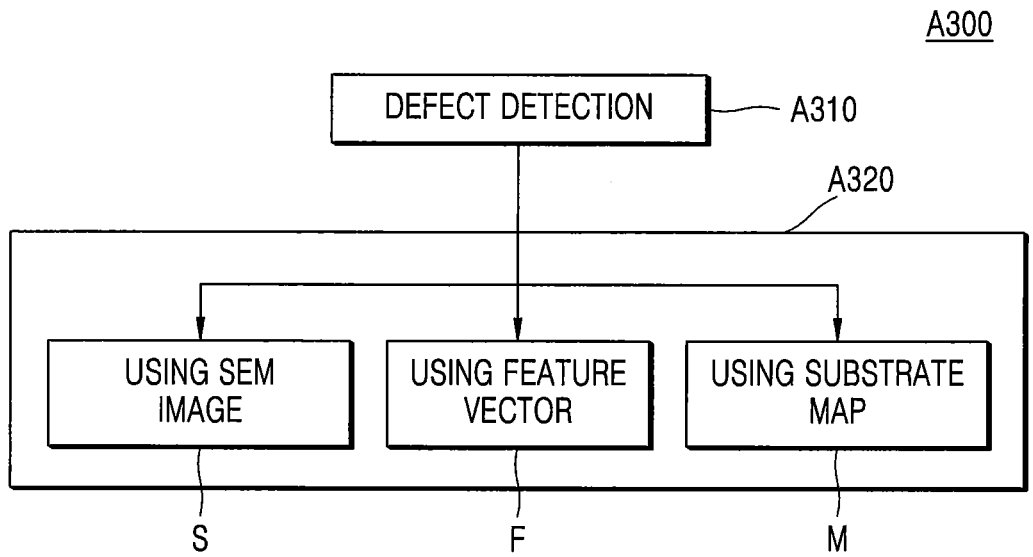
FIGS. 12 and 13 are conceptual diagrams of ADC processes according to embodiments of the inventive concept.

In some other embodiments, the defect classification process M using the substrate map may be performed with the defect classification process using the SEM image in order (refer to FIG. 12).

FIG. 8 is an exemplary view of detecting a scratch through a defect classification process using the substrate map W1.

Referring to FIG. 8, a plurality of defective parts Ft are positioned on the substrate map W1, and defective parts positioned in a first area Area1 from among the defective parts Ft have fixed directivity. In this case, the defective parts positioned in the first area Area1 may be classified as a scratch.

In this case, the map DOI rule may be defined similar to, for example, "when at least three defects are continuously formed with fixed directivity, the map DOI is classified as a scratch."

Figure 13:
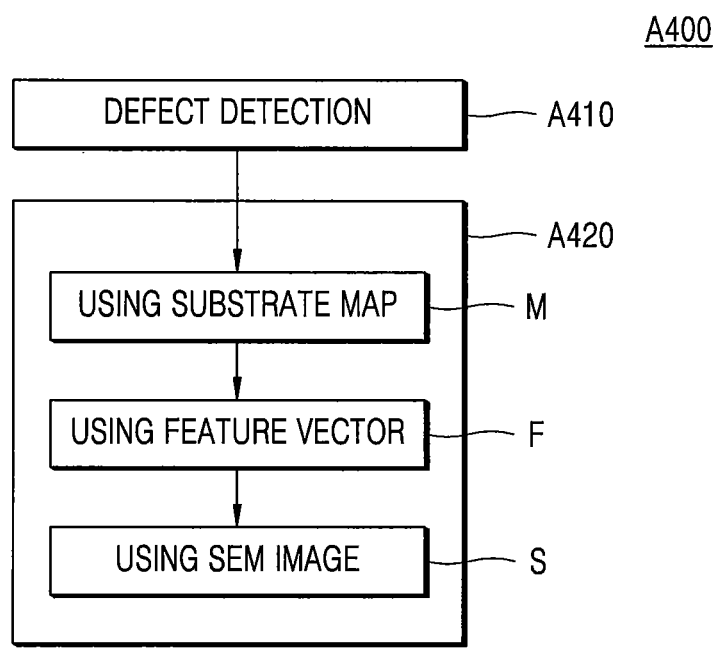

In some embodiments, as illustrated in FIG. 13, when a defect classification process M using a substrate map is performed before a defect classification process S using an SEM image, the defect classification process S using the SEM image may be performed excluding the defective parts positioned in the first area Area1 from among the defective parts Ft. In other words, the defect classification process M using the substrate map may be used to determine whether or not analysis using the SEM image corresponding to the defective parts Ft is performed. In this case, it is not necessary to perform the entire defective parts Ft; rather, it is possible to improve process efficiency by performing an SEM image analysis only in a defective part where the SEM image analysis is required.

FIG. 9 is an exemplary view of detecting a photomask defect through the defect classification process using a substrate map W2.

Referring to FIG. 9, a plurality of defective parts Ft are positioned on the substrate map W2 and exist in an identical position in a second area Area2. In other words, the defective parts Ft are repeatedly formed in the second area Area2 that may be considered a unit area. Such defective parts Ft are more likely to be formed due to a photomask defect disposed along the unit area.

, In this case, the map DOI rule may be defined similar to, for example, "when the defective parts are repeatedly disposed based on the unit area, the map DOI is classified as photomask defect."

In some embodiments, when the map DOI of the defective parts Ft is classified as photomask defect, an SEM image analysis may not be performed corresponding to the defective parts Ft.

Figure 10:
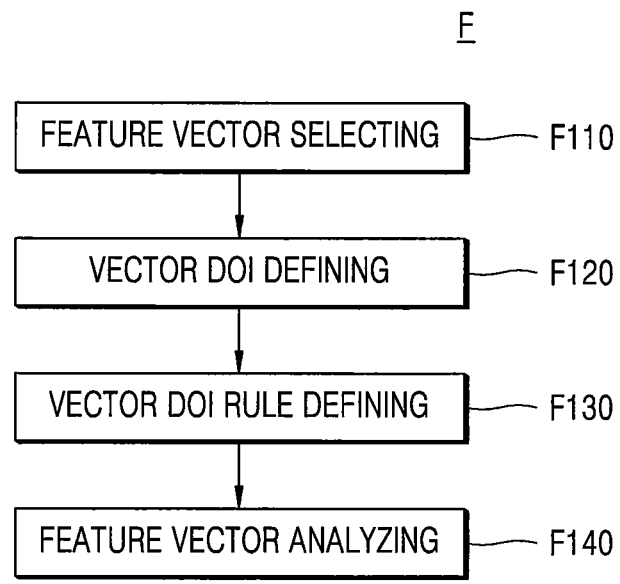
FIG. 10 is a flowchart of a defect classification process using a feature vector according to an embodiment of the inventive concept.

FIG. 10 is a flowchart of a defect classification process F using a feature vector according to an embodiment of the inventive concept.

Referring to FIG. 10, the defect classification process F using the feature vector may include a feature vector selecting step F110, a vector DOI defining step F120, a vector DOI rule defining step F130, and a feature vector analyzing step F140.

In the feature vector selecting step F110, a feature vector may be selected from among feature vectors that are included in measured data of respective defective parts detected by the defect detection process A110 described with reference to FIG. 1. The measured data may include, for example, several tens to several hundreds of the feature vectors, and at least one feature vector may be arbitrarily selected from among the feature vectors.

In some embodiments, a weight may be assigned to at least one feature vector from among the selected feature vector.

The vector DOI defining step F120 may define vector DOIs categorizing defect types of the respective defective parts. For example, the vector DOIs may include first to third classes (refer to FIG. 11).

In some embodiments, the vector DOIs may be separately constituted from DOIs described with reference to FIGS. 2 to 6. In some other embodiments, at least a part of vector DOIs from among the vector DOIs may be included in the DOIs described with reference to FIGS. 2 to 6.

The vector DOI rule defining step F130 may define a vector DOI rule that is a criterion for determining that defect types of the respective defective parts correspond to which vector DOI from among the vector DOIs. In other words, the vector DOI rule may be criteria for determining the respective vector DOIs.

The feature vector analyzing step F140 may analyze the feature vector according to the vector DOI rule and may classify that the defects of the respective defective parts correspond to which vector DOI from among the vector DOIs.

In some embodiments, the defect classification process F using the feature vector may be separately performed from the defect classification process S1 or S2 using the SEM image described with reference to FIG. 2 or 6 (refer to FIG. 12).

In some other embodiments, the defect classification process F using the feature vector may be performed with the defect classification process using the SEM image in order (refer to FIG. 13).

Figure 11:
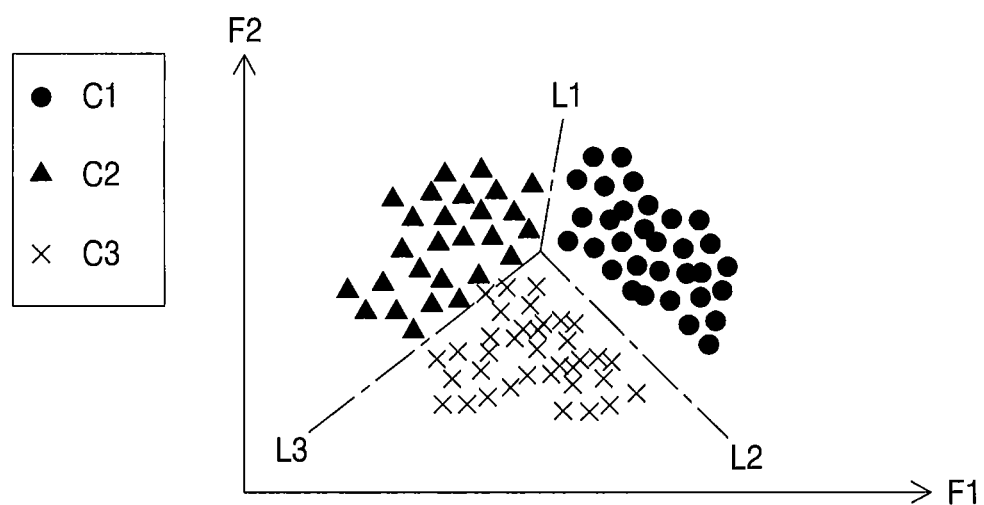
FIG. 11 is an exemplary view of a defect classification process using a feature vector.

FIG. 11 is an exemplary view of a defect classification process using a feature vector.

Referring to FIG. 11, a case of that first and second feature vectors F1 and F2 are selected from among a plurality of feature vectors included in the measured data described with reference to FIG. 10 is illustrated, wherein defective parts are distributed along the first and second feature vectors F1 and F2.

The defective parts may be classified as first to third classes C1 to C3 according to the vector DOI rule described with reference to FIG. 10.

The vector DOI rule may include, for example, "when a first feature vector F1 value is greater than a first reference line L1 value and a second feature vector F2 value is greater than a second reference line L2 value, the vector DOI is classified as the first class C1," "when the first feature vector F1 value is less than the first reference line L1 value and the second feature vector F2 value is greater than a third reference line L3 value, the vector DOI is classified as the second class C2," or "when the first feature vector F1 value is less than the second reference line L2 value and the second feature vector F2 value is less than the third reference line L3 value, the vector DOI is classified as the third class C3."

In some embodiments, when the defect classification process F using a feature vector is performed before the defect classification process S using an SEM image as illustrated in FIG. 13, the defect classification process S using the SEM image may be performed corresponding only to a part of the first to third classes C1 to C3. In this case, without necessary to perform an SEM image analysis corresponding to the entire defective parts included in the first to third classes C1 to C3, it is possible to improve process efficiency by performing the SEM image analysis only in a class where the SEM image analysis is required.

FIGS. 12 and 13 are conceptual diagrams of ADC processes A300, A400 according to embodiments of the inventive concept.

As illustrated in FIGS. 12 and 13, defect classification processes A320 and A420 in order to classify defect types of defective parts detected in defect detection processes A310 and A410 may be performed after performing the defect detection processes A310 and A410.

The defect classification processes A320 and A420 may include at least one defect classification process from among the defect classification process S using the SEM image, the defect classification process F using the feature vector, and the defect classification process M using the substrate map.

Meanwhile, performing methods of the defect classification process S using the SEM image, the defect classification process F using the feature vector, and the defect classification process M using the substrate map in the defect classification processes A320 and A420 may vary.

For example, as illustrated in FIG. 12, the defect classification process S using the SEM image, the defect classification process F using the feature vector, and the defect classification process M using the substrate map may be sequentially performed during the defect classification process A320.

Whereas, as illustrated in FIG. 13, the defect classification process S using the SEM image, the defect classification process F using the feature vector, and the defect classification process M using the substrate map may be sequentially performed during the defect classification process A420. For example, defects may be primarily classified through the defect classification process M using the substrate map (primary classification), the defects may be secondarily classified through the defect classification process F using the feature vector in the primary classification results (secondary classification), and the defects may be tertiarily classified through the defect classification process S using the SEM image in the secondary classification results (tertiary classification).

Figure 14:
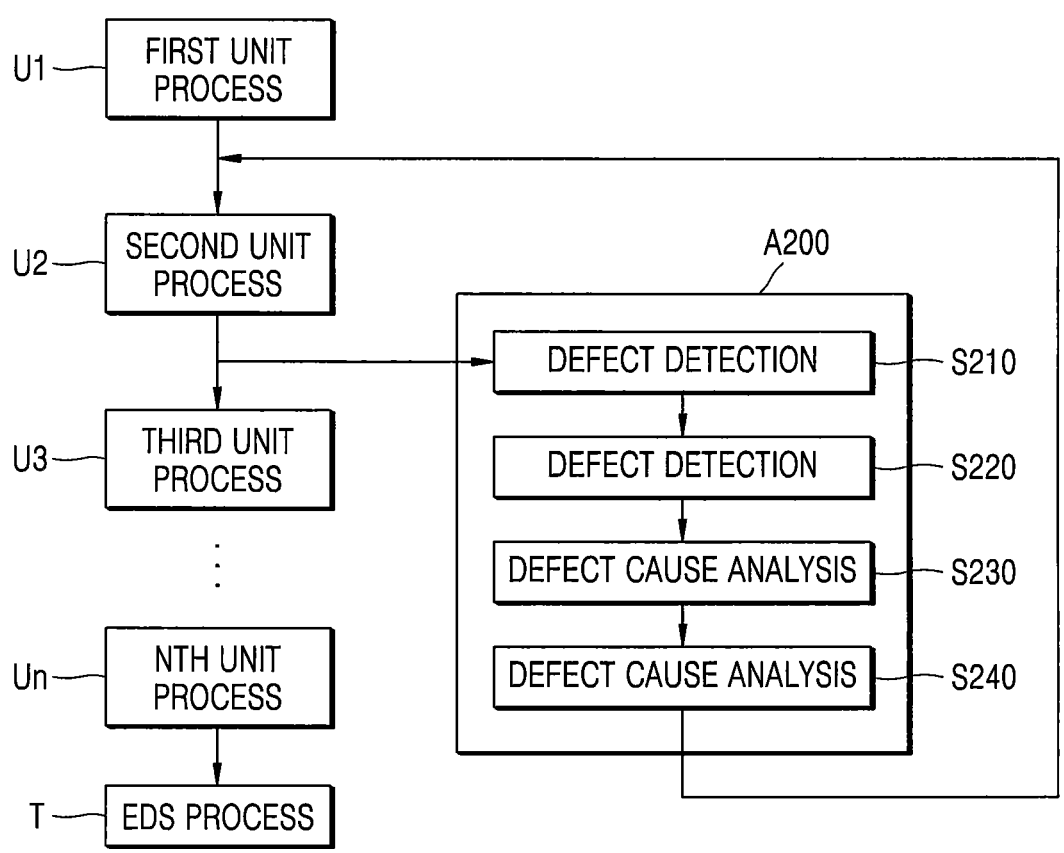
FIG. 14 is an exemplary view of a semiconductor manufacturing process including an ADC process according to another embodiment of the inventive concept.

FIG. 14 is an exemplary view of a semiconductor manufacturing process including an ADC process according to another embodiment of the inventive concept.

Referring to FIG. 14, the semiconductor manufacturing process may include the plurality of unit processes U1 to Un, at least one ADC process A200, and the test process T.

The ADC process A200 may include a defect detection process A210, a defect classification process A220, a defect cause analysis process A230, and a process recipe correcting process A240.

Although the ADC process A200 according to the present exemplary embodiment may be performed similar to the ADC process A100 described with reference to FIG. 1, there is a difference between the ADC process A200 and the ADC process A100 in that the defect cause analysis process A230, and the process recipe correcting process A240 are additionally performed in the ADC process A200.

Meanwhile, although it is explained that the defect cause analysis process A230 and the process recipe correcting process A240 are included in the ADC process A200, but is not limited thereto. In other words, the defect cause analysis process A230 and the process recipe correcting process A240 may be separately performed after the ADC process A200.

The defect detection process A210 is a process of detecting defects on a substrate (not shown) after the second unit process U2 is performed, and through the defect detection process A210, a plurality of defective parts (not shown) capable of being positioned on the substrate after the second unit process U2 is performed may be detected.

In the defect classification process A220, the defect types of the respective defective parts that are detected are classified.

The defect detection process A210 and the defect classification process A220 may be respectively performed similar to the defect detection process A110 and the defect classification process A120 described with reference to FIG. 1

In the defect cause analysis process A230, a cause of a defect of each DOI classified by the defect classification process A220 may be analyzed.

For example, when a DOI of a defective part is classified as the insulating line bridge D1 described with reference to FIG. 3B through the defect classification process A220, the cause of the defect may be analyzed as a particle problem in a patterning process.

For another example, when a DOI of a defective part is classified as the conductive line bridge D2 described with reference to FIG. 4B, the cause of the defect may be analyzed as a photomask problem in a patterning process.

For further another example, when a DOI of a defective part is classified as the conductive dot void D3 described with reference to FIG. 5B, the cause of the defect may be analyzed as a conductive material filling defect.

In the process recipe correcting process A240, a process recipe in the second unit process U2 may be corrected based on the cause of the defect analyzed by the defect cause analysis process A230, but the process recipe correcting process A240 is not limited thereto. When the cause of the defect is analyzed as in the first unit process U1 performed before the second unit process U2, the process recipe in the first unit process, U1 may be corrected.

When detected defective parts are automatically classified according to which detected defective parts correspond to which DOI from among a plurality of DOIs, and a cause of a defect corresponding to each of the DOIs is analyzed like in the present exemplary embodiment, process time and cost for a defect classification and a defect cause analysis may be reduced and a process yield may also be improved by performing feedback defect information.

While the inventive concept has been particularly shown and described with reference to exemplary embodiments thereof, it will be understood that various changes in form and details may be made therein without departing from the spirit and scope of the following claims.

What is claimed is:

1. An automatic defect classification (ADC) method, comprising:
    detecting defective parts on a substrate upon which at least one semiconductor manufacturing process has been performed; and
    classifying defect types of the respective defective parts, wherein classifying comprises:
        obtaining a scanning electron microscope (SEM) image of each of the defective parts;
        registering information about the substrate in a graphic data system (GDS) image corresponding to each SEM image;
        defining a plurality of defects of interest (DOIs);
        defining a DOI rule for determining which defects of the defective parts comprise a DOI from among the plurality of DOIs; and
        analyzing the SEM image and the GDS image according to the DOI rule to classify which of the defects of the respective defective parts correspond to which of the DOIs.

2. The method of claim 1, wherein the information about the substrate comprises information about one of an insulating line pattern, a conductive line pattern, and a conductive dot pattern.

3. The method of claim 2, wherein the information about the substrate comprises material information about one of the insulating line pattern, the conductive line pattern, and the conductive dot pattern.

4. The method of claim 3, wherein analyzing comprises:
    obtaining a matched region and an unmatched region by matching the SEM image with the GDS image; and
    analyzing the unmatched region.

5. The method of claim 4, wherein analyzing the unmatched region comprises:
    comparing and analyzing material information about the unmatched region with material information registered in the GDS image in a region corresponding to the unmatched region.

6. The method of claim 3, wherein the information about the substrate comprises material information about the conductive line pattern,
    wherein at least one DOI from among the plurality of DOIs comprises an insulating line bridge, and
    wherein the DOI rule is defined as when the material information registered in the GDS image of the region corresponding to the unmatched region is the same as the material information about the conductive line pattern, the DOI is classified as the insulating line bridge.

7. The method of claim 3, wherein the information about the substrate comprises material information about the insulating line pattern,
    wherein at least one DOI from among the plurality of DOIs comprises a conductive line bridge, and
    wherein the DOI rule is defined as when the material information registered in the GDS image of the region corresponding to the unmatched region is the same as the material information about the insulating line pattern, the DOI is classified as the conductive line bridge.

8. The method of claim 3, wherein the information about the substrate comprises material information about the conductive dot pattern and material information about a barrier layer surrounding the conductive dot pattern,
    wherein at least one DOI from among the plurality of DOIs comprises a conductive dot void, and
    wherein in order to classify the DOI into the conductive dot void, the DOI rule is defined as when the unmatched region is positioned in the barrier layer while the material information registered in the GDS image of the region corresponding to the unmatched region is the same as the material information about the conductive dot pattern, the DOI is classified as the conductive dot void.

9. The method of claim 1, wherein defining the DOI rule comprises:
    defining a temporary DOI rule;
    determining reliability of the temporary DOI rule; and
    defining the temporary DOI rule as a fixed DOI rule when it is determined that a defect classification result by the temporary DOI rule reaches or exceeds a criteria reliability value.

10. The method of claim 1, further comprising:
    analyzing a cause of a defect, based on a result of classifying defect types of the respective defective parts; and
    correcting a process recipe of the at least one semiconductor manufacturing process based on the cause of the defect.

11. An automatic defect classification (ADC) method, comprising:
    detecting defective parts on a substrate upon which at least one semiconductor manufacturing process has been performed;
    a first classifying defect types of the respective defective parts by using a feature vector, and
    a second classifying the defect types of the respective defective parts by using a scanning electron microscope (SEM) image, wherein the second classifying comprises:
        defining a plurality of defects of interest (DOIs);
        defining a DOI rule for determining which defects of the defective parts comprise a DOI from among the plurality of DOIs; and
        analyzing the SEM image and a graphic data system (GDS) image according to the DOI rule and classifying which of the defects correspond to which of the DOIs.

12. The method of claim 11, wherein detecting defective parts comprises obtaining an optical image of the substrate via an optical inspection apparatus and generating a substrate map,
    the method further comprising:
    a third classifying the defect types on the substrate map.

13. The method of claim 12, wherein classifying the defect types on the substrate map comprises:
    defining a plurality of map DOIs categorizing the defect types on the substrate map; and
    defining a map DOI rule for determining which defects on the substrate map comprise a DOI from among the plurality of DOIs.

14. The method of claim 11, wherein analyzing comprises:
    obtaining respective SEM images of the defective parts; and registering substrate information in respective GDS images corresponding to the SEM images.

15. The method of claim 11, wherein the first classifying precedes the second classifying.

16. An automatic defect classification method (ADC), comprising:

domain defective parts on a substrate upon which at least one semiconductor manufacturing process has been performed, the detecting comprising obtaining an optical image of the substrate via an optical inspection apparatus and generating a substrate map; and classifying defect types of the respective defective parts by simultaneously using a feature vector and a scanning electron microscope (SEM) image of each of the defective parts.

17. The method of claim 16, wherein classifying the defect types of the respective defective parts by using an SEM image comprises:

defining a plurality of defects of interest (DOIs);

defining a DOI rule for determining which defects of the defective parts comprise a DOI from among the plurality of DOIs; and analyzing the SEM image and a graphic data system (GDS) image according to the DOI rule to classify which of the defects of the respective defective parts correspond to which of the DOIs, wherein the GDS image comprises information about the substrate.

18. The method of claim 17, wherein the information about the substrate comprises information about one of an insulating line pattern, a conductive line pattern, and a conductive dot pattern.

19. The method of claim 16, wherein classifying defect types of the respective defective parts comprises sequentially using the substrate map, the feature vector and the SEM image of each of the defective parts.

20. The method of claim 16, wherein classifying defect types of the respective defective parts comprises simultaneously using the feature vector, the SEM image of each of the defective parts, and the substrate map.

* * * * *